US007106380B2

(12) United States Patent
Willis

(10) Patent No.: US 7,106,380 B2
(45) Date of Patent: Sep. 12, 2006

(54) FRAME RATE MULTIPLIER FOR LIQUID CRYSTAL DISPLAY

(75) Inventor: Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/804,554

(22) Filed: Mar. 12, 2001

(65) Prior Publication Data

US 2002/0126218 A1 Sep. 12, 2002

(51) Int. Cl.
*H04N 5/44* (2006.01)

(52) U.S. Cl. ........ 348/459

(58) Field of Classification Search ........ 348/459, 348/448, 449, 447, 458, 443, 911
See application file for complete search history.

(56) References Cited

U.S. PATENT DOCUMENTS 4,888,641 A * 12/1989 Isnardi et al. .......... 375/240.25
5,111,297 A * 5/1992 Tsuji et al. .......... 348/565
5,159,451 A * 10/1992 Faroudja et al. .......... 348/448
5,801,772 A * 9/1998 Asaida et al. .......... 348/222.1
5,835,150 A * 11/1998 Choi .......... 348/441
6,008,790 A * 12/1999 Shingu et al. .......... 345/116
6,111,610 A * 8/2000 Faroudja .......... 348/441
6,222,589 B1 * 4/2001 Faroudja et al. .......... 348/448
6,236,806 B1 * 5/2001 Kojima et al. .......... 386/131
6,348,926 B1 * 2/2002 Nozawa et al. .......... 345/603

FOREIGN PATENT DOCUMENTS

EP 1241656 A2 * 3/2002

* cited by examiner

*Primary Examiner*—Paulos M. Natnael
(74) *Attorney, Agent, or Firm*—Joseph J. Laks; Harvey D. Fried; Christine Johnson

(57) ABSTRACT

A method for multiplying the frame rate of an input video signal having a line rate $f_H$in and a frame rate $f_V$in, comprising the steps of: propagating the input video signal through just enough memory to delay the input video signal by a fraction of a frame period $1/f_V$in; speeding up the delayed video signal to a first line rate faster than $f_H$in; speeding up the input video signal to a second line rate faster than $f_H$in; supplying the speeded up video signal and the delayed speeded up video signal sequentially, one line at a time; and, writing the sequentially supplied lines into a liquid crystal display at the faster line rate, thereby writing at least some of the lines multiple times within each the frame period. A corresponding apparatus can comprise: a partial frame memory; two speedup memories; a multiplexer; and, a source of clock and control signals.

27 Claims, 10 Drawing Sheets

| INPUT VIDEO | 1/2 FRAME DELAYED MUX INPUT | REAL TIME MUX INPUT | MUX OUTPUT | DISPLAY RESULT (→ = OVERWRITES) | SEQUENCE |
|---|---|---|---|---|---|
| P1/L1 | NULL | P1/L1 | NULL | NULL | |
| P1/L2 | NULL | P1/L2 | NULL | NULL | |
| • | • | • | • | | |
| P1/L240 | NULL | P1/L240 | NULL | NULL | |
| P1/L241 | P1/L1 | P1/L241 | P1/L1 | P1/L1→NULL | |
| — | — | — | P1/L241 | P1/L241→NULL | |
| P1/L242 | P1/L2 | P1/L242 | P1L/2 | P1/L2→NULL | A |
| — | — | — | P1/L242 | P1/L242→NULL | |
| P1/L243 | P1/L3 | P1/L243 | P1/L3 | P1/L3→NULL | |
| — | — | — | P1/L243 | P1/L243→NULL | |
| • | • | • | • | • | |
| P1/L480 | P1/L240 | P1/L480 | P1/L240 | P1/L240→NULL | |
| — | — | — | P1/L480 | P1/L480→NULL | |
| P2/L1 | P1/L241 | P2/L1 | P2/L1 | P2/L1→P1/L1 | |
| — | — | — | P1/L241 | P1/L241→P1/L241 | |
| P2/L2 | P1/L242 | P2/L2 | P2/L2 | P2/L2→P1/L2 | |
| — | — | — | P1/L242 | P1/L242→P1/L242 | B |
| • | • | • | • | • | |
| P2/L240 | P1/L480 | P2/L240 | P2/L240 | P2/L240→P1/L240 | |
| — | — | — | P1/L480 | P1/L480→P1/L480 | |
| P2/L241 | P2/L1 | P2/L241 | P2/L1 | P2/L1→P2/L1 | |
| — | — | — | P2/L241 | P2/L241→P1/L241 | |
| P2/L242 | P2/L2 | P2/L242 | P2/L2 | P2/L2→P2/L2 | |
| — | — | — | P2/L242 | P2/L242→P1/L242 | C |
| • | • | • | • | • | |
| P2/L480 | P2/L240 | P2/L480 | P2/L240 | P2/L240→P1/L240 | |
| — | — | — | P2/L480 | P2/L480→P1/L480 | |
| P3/L1 | P2/L241 | P3/L1 | P3/L1 | P3/L1→P2/L1 | |
| — | — | — | P2/L241 | P2/L241→P2/L241 | |
| P3/L2 | P2/242 | P3/L2 | P3/L2 | P3/L2→P2/L2 | |
| — | — | — | P2/L242 | P2/L242→P2/L242 | D |
| • | • | • | • | • | |
| P3/L240 | P2/L480 | P3/L240 | P3/L240 | P3/L240→P2/L240 | |
| — | — | — | P2/L480 | P2/L480→P2/L480 | |
| P3/L241 | P3/L1 | P3/L241 | P3/L1 | P3/L1→P3/L1 | |
| — | — | — | P3/L241 | P3/L241→P2/L241 | |
| P3/L242 | P3/L2 | P3/L242 | P3/L2 | P3/L2→P3/L2 | |
| — | — | — | P3/L242 | P3/L242→P2/L242 | E |
| • | • | • | • | • | |
| P3/L480 | P3/L240 | P3/L480 | P3/L240 | P3/L240→P3/L240 | |
| — | — | — | P3/L480 | P3/L480→P2/L480 | |
| P4/L1 | P3/L241 | P4/L1 | P4/L1 | P4/L1→P3/L1 | |
| — | — | — | P3.L241 | P3/L241→P3/L241 | |
| P4/L2 | P3/L242 | P4/L2 | P4/L2 | P4/L2→P3/L2 | |
| — | — | — | P3/L242 | P3/L242→P3/L242 | F |
| • | • | • | • | • | |
| P4/L240 | P3/L480 | P4/L240 | P4/L240 | P4/L240→P3/L240 | |
| — | — | — | P3/L480 | P3/L480→P3/L480 | |

FIG. 2(a)

| INPUT VIDEO | 1/2 FRAME DELAYED MUX INPUT | REAL TIME MUX INPUT | MUX OUTPUT | DISPLAY RESULT (→ = OVERWRITES) | SEQUENCE |
|---|---|---|---|---|---|
| P1/L1 | NULL | P1/L1 | NULL | NULL | |
| P1/L2 | NULL | P1/L2 | NULL | NULL | |
| • | • | • | • | | |
| P1/L240 | NULL | P1/L240 | NULL | NULL | |
| P1/L241 | P1/L1 | P1/L241 | P1/L241 | P1/L241→NULL | |
| — | — | — | P1/L1 | P1/L1→NULL | |
| P1/L242 | P1/L2 | P1/L242 | P1/L242 | P1/L242→NULL | A |
| — | — | — | P1L/2 | P1/L2→NULL | |
| P1/L243 | P1/L3 | P1/L243 | P1/L243 | P1/L243→NULL | |
| — | — | — | P1/L3 | P1/L3→NULL | |
| • | • | • | • | • | |
| P1/L480 | P1/L240 | P1/L480 | P1/L480 | P1/L480→NULL | |
| — | — | — | P1/L240 | P1/L240→NULL | |
| P2/L1 | P1/L241 | P2/L1 | P2/L1 | P2/L1→P1/L1 | |
| — | — | — | P1/L241 | P1/L241→P1/L241 | |
| P2/L2 | P1/L242 | P2/L2 | P2/L2 | P2/L2→P1/L2 | |
| — | — | — | P1/L242 | P1/L242→P1/L242 | B |
| • | • | • | • | • | |
| P2/L240 | P1/L480 | P2/L240 | P2/L240 | P2/L240→P1/L240 | |
| — | — | — | P1/L480 | P1/L480→P1/L480 | |
| P2/L241 | P2/L1 | P2/L241 | P2/L241 | P2/L241→P1/L241 | |
| — | — | — | P2/L1 | P2/L1→P2/L1 | |
| P2/L242 | P2/L2 | P2/L242 | P2/L242 | P2/L242→P1/L242 | |
| — | — | — | P2/L2 | P2/L2→P2/L2 | C |
| • | • | • | • | • | |
| P2/L480 | P2/L240 | P2/L480 | P2/L480 | P2/L480→P1/L480 | |
| — | — | — | P2/L240 | P2/L240→P1/L240 | |
| P3/L1 | P2/L241 | P3/L1 | P3/L1 | P3/L1→P2/L1 | |
| — | — | — | P2/L241 | P2/L241→P2/L241 | |
| P3/L2 | P2/242 | P3/L2 | P3/L2 | P3/L2→P2/L2 | |
| — | — | — | P2/L242 | P2/L242→P2/L242 | D |
| • | • | • | • | • | |
| P3/L240 | P2/L480 | P3/L240 | P3/L240 | P3/L240→P2/L240 | |
| — | — | — | P2/L480 | P2/L480→P2/L480 | |
| P3/L241 | P3/L1 | P3/L241 | P3/L241 | P3/L241→P2/L241 | |
| — | — | — | P3/L1 | P3/L1→P3/L1 | |
| P3/L242 | P3/L2 | P3/L242 | P3/L242 | P3/L242→P2/L242 | |
| — | — | — | P3/L2 | P3/L2→P3/L2 | E |
| • | • | • | • | • | |
| P3/L480 | P3/L240 | P3/L480 | P3/L480 | P3/L480→P2/L480 | |
| — | — | — | P3/L240 | P3/L240→P3/L240 | |
| P4/L1 | P3/L241 | P4/L1 | P4/L1 | P4/L1→P3/L1 | |
| — | — | — | P3.L241 | P3/L241→P3/L241 | |
| P4/L2 | P3/L242 | P4/L2 | P4/L2 | P4/L2→P3/L2 | |
| — | — | — | P3/L242 | P3/L242→P3/L242 | F |
| • | • | • | • | • | |
| P4/L240 | P3/L480 | P4/L240 | P4/L240 | P4/L240→P3/L240 | |
| — | — | — | P3/L480 | P3/L480→P3/L480 | |

FIG. 2(b)

| SEQUENCE | PORTION OF PICTURE | ACTION ON DISPLAY ( AT $4f_H$ ) | NEW OR REPEAT | TOP/BOTTOM REFERENCE SYMBOLS |
|---|---|---|---|---|
| A | TOP HALF | WRITE TOP P1 | NEW | |
| | BOTTOM HALF | WRITE BOTTOM P1 | NEW | α1 |
| B | TOP HALF | WRITE TOP P2 | NEW | β1 |
| | BOTTOM HALF | WRITE BOTTOM P1 | REPEAT | α2 |
| C | TOP HALF | WRITE TOP P2 | REPEAT | β2 |
| | BOTTOM HALF | WRITE BOTTOM P2 | NEW | γ1 |
| D | TOP HALF | WRITE TOP P3 | NEW | δ1 |
| | BOTTOM HALF | WRITE BOTTOM P2 | REPEAT | γ2 |
| E | TOP HALF | WRITE TOP P3 | REPEAT | δ2 |
| | BOTTOM HALF | WRITE BOTTOM P3 | NEW | ε1 |
| F | TOP HALF | WRITE TOP P4 | NEW | ζ1 |
| | BOTTOM HALF | WRITE BOTTOM P3 | REPEAT | ε2 |
| G | TOP HALF | WRITE TOP P4 | REPEAT | ζ2 |
| | BOTTOM HALF | WRITE BOTTOM P4 | NEW | η1 |
| H | TOP HALF | WRITE TOP P5 | NEW | θ1 |
| | BOTTOM HALF | WRITE BOTTOM P4 | REPEAT | η2 |
| I | TOP HALF | WRITE TOP P5 | REPEAT | θ2 |
| | BOTTOM HALF | WRITE BOTTOM P5 | NEW | |

FIG. 3

| | $^1/_{nfVin}$ IN SECONDS | | |
|---|---|---|---|
| $f_V$in | n=2 | n=3 | n=4 |
| 50 Hz | $^1/_{100}$ | $^1/_{150}$ | $^1/_{200}$ |
| 60 Hz | $^1/_{120}$ | $^1/_{180}$ | $^1/_{240}$ |

FIG. 9(a)

| | $nf_H$in | | |
|---|---|---|---|
| $f_H$in | n=2 | n=3 | n=4 |
| $1f_H$ | $2f_H$ | $3f_H$ | $4f_H$ |
| $2f_H$ | $4f_H$ | $6f_H$ | $8f_H$ |
| $3f_H$ | $6f_H$ | $9f_H$ | $12f_H$ |

FIG. 9(b)

| n | DELAY MEMORY SIZE | SPEEDUP MEMORIES IN ARRAY 218 | OUTPUT INTERVAL DELAY |
|---|---|---|---|
| 2 | $^1/_2$ FRAME | 1 | $^1/_2$ FRAME |
| 3 | $^2/_3$ FRAME | 2 | $^1/_3$ FRAME |
| 4 | $^3/_4$ FRAME | 3 | $^1/_4$ FRAME |

FIG. 9(c)

FRAME RATE MULTIPLIER FOR LIQUID CRYSTAL DISPLAY

BACKGROUND OF THE INVENTION

1. Field of the Invention

The invention arrangements relate to the field of LCOS (liquid crystal on silicon) and/or LCD (liquid crystal display) video display systems, both reflective and transmissive.

2. Description of Related Art

Liquid crystal on silicon (LCOS) can be thought of as one large liquid crystal formed on a silicon wafer. The silicon wafer is divided into an incremental array of tiny plate electrodes. A tiny incremental region of the liquid crystal is influenced by the electric field generated by each tiny plate and the common plate. Each such tiny plate and corresponding liquid crystal region are together referred to as a cell of the imager. Each cell corresponds to an individually controllable pixel. A common plate electrode is disposed on the other side of the liquid crystal. Each cell, or pixel, remains lighted with the same intensity until the input signal is changed, thus acting as a sample and hold. The pixel does not decay, as is the case with the phosphors in a cathode ray tube. Each set of common and variable plate electrodes forms an imager. One imager is provided for each color, in this case, one imager each for red, green and blue.

It is typical to drive the imager of an LCOS display with a frame-doubled signal to avoid 30 Hz flicker, by sending first a normal frame (positive picture) and then an inverted frame (negative picture) in response to a given input picture. The generation of positive and negative pictures ensures that each pixel will be written with a positive electric field followed by a negative electric field. The resulting drive field has a zero DC component, which is necessary to avoid the image sticking, and ultimately, permanent degradation of the imager. It has been determined that the human eye responds to the average value of the brightness of the pixels produced by these positive and negative pictures.

The drive voltages are supplied to plate electrodes on each side of the LCOS array. In the presently preferred LCOS system to which the inventive arrangements pertain, the common plate is always at a potential of about 8 volts. This voltage can be adjustable. Each of the other plates in the array of tiny plates is operated in two voltage ranges. For positive pictures, the voltage varies between 0 volts and 8 volts. For negative pictures the voltage varies between 8 volts and 16 volts.

The light supplied to the imager, and therefore supplied to each cell of the imager, is field polarized. Each liquid crystal cell rotates the polarization of the input light responsive to the root mean square (RMS) value of the electric field applied to the cell by the plate electrodes. Generally speaking, the cells are not responsive to the polarity (positive or negative) of the applied electric field. Rather, the brightness of each pixel's cell is generally only a function of the rotation of the polarization of the light incident on the cell. As a practical matter, however, it has been found that the brightness can vary somewhat between the positive and negative field polarities for the same polarization rotation of the light. Such variation of the brightness can cause an undesirable flicker in the displayed picture.

In this embodiment, in the case of either positive or negative pictures, as the field driving the cells approaches a zero electric field strength, corresponding to 8 volts, the closer each cell comes to white, corresponding to a full on condition. Other systems are possible, for example where the common voltage is set to 0 volts. It will be appreciated that the inventive arrangements taught herein are applicable to all such positive and negative field LCOS imager driving systems.

Pictures are defined as positive pictures when the variable voltage applied to the tiny plate electrodes is less than the voltage applied to the common plate electrode, because the higher the tiny plate electrode voltage, the brighter the pixels. Conversely, pictures are defined as negative pictures when the variable voltage applied to the tiny plate electrodes is greater than the voltage applied to the common plate electrode, because the higher the tiny plate electrode voltage, the darker the pixels. The designations of pictures as positive or negative should not be confused with terms used to distinguish field types in interlaced video formats.

The present state of the art in LCOS requires the adjustment of the common-mode electrode voltage, denoted $V_{ITO}$, to be precisely between the positive and negative field drive for the LCOS. The subscript ITO refers to the material indium tin oxide. The average balance is necessary in order to minimize flicker, as well as to prevent a phenomenon known as image sticking.

In the following description, the term $f_H$in is used herein to denote the horizontal scanning frequency of an input video signal. The term $f_V$in is used to denote the vertical scanning frequency of an input video signal. In the standard definition interlaced NTSC system, $f_H$in might be 15,750 Hz ($1f_H$) or 31,500 Hz ($2f_H$). Typically, $f_V$in is 60 Hz for NTSC and 50 Hz for PAL. High definition formats have been defined by the ATSC. The term 480p refers to a video signal having 480 lines of video in each progressive (non-interlaced) frame.

A 720p video signal has 720 lines of video in each frame. The term 1080i refers to a video signal having 1,080 interlaced horizontal lines in top and bottom fields, each field having 540 horizontal lines. In accordance with this convention, the term 720i would denote 720 lines of interlaced video per frame and the term 1080p would denote 1,080 lines of progressive horizontal lines in each frame. Typically, such high definition systems have an $f_H\text{in} \geqq 2f_H$.

The letter n is used herein to denote a multiple of $f_H$in or $f_V$in. Assume, for example, that a 480p input video signal is speeded up by the multiple n=2. Since $f_H\text{in}=2f_H$ the horizontal scanning frequency is doubled to $4f_H$. Assume, for example, that the same 480p input video signal is subjected to a 1/n-frame delay, also where n=2. Since the 480p input video signal has an $f_V\text{in}=60$ Hz, the delay is 1/120 second. The multiple n need not be an integer. If $f_H\text{in}=2.14f_H$, and n=2, the video signal is speeded up to $4.28f_H$. A 720p video signal, for example, has $f_H\text{in}=3f_H$. If $f_H\text{in}=3f_H$ and n=2, the video signal is speeded up to $6f_H$.

In order to avoid visible flicker, it is common practice to use a higher vertical scanning frequency, or frame rate, to suppress flicker. In an NTSC system, for example, if n=2 a frame rate of 60 Hz is doubled to a frame rate of 120 Hz. In a PAL system, a field rate of 50 Hz is doubled to a field rate of 100 Hz. However, the higher frame rate or field rate makes adjustment of the common mode electrode voltage more difficult because the flicker is not visible to the human eye. An operator can not make the necessary adjustments without special instruments.

Faster frame rates have required frame rate doublers, that is, a circuit that can cause each picture to be scanned twice within each frame period of the incoming video signal. A 60 Hz frame rate has a frame period of 1/60 second. Doubling a frame rate of 60 Hz requires scanning at 120 Hz. A 120 Hz frame rate has a frame period of 1/120 second. If an incoming video signal has a horizontal scanning frequency of $2f_H$, where $f_H$ is for example a standard NTSC horizontal scanning rate, and a standard frame rate of 60 Hz, the pictures must be displayed at $4f_H$ and 120 Hz. In other words, each picture must be displayed twice during each 60 Hz frame period, that is, in every 1/60 second. Each line must be written to the display at $4f_H$.

In accordance with the prior art, frame rate doublers utilize two full frame memories in a so-called ping-pong arrangement. A frame is written into one memory as another frame is read out of the other memory, and vice versa, in an alternating manner. This technique always incurs a full frame period of video delay because neither of the ping-pong frame memories can be read out until a full frame has been written in. Accordingly, the audio signal must be delayed to match the video delay. It was known that the memory requirements could be reduced to one full frame memory by proper utilization of the memory in a correctly implemented video speedup arrangement. However, for any frame multiplication greater than doubling, the alternative use of one full frame memory is not workable. Two full frame memories are always required in such a situation.

SUMMARY OF THE INVENTION

The problems of the prior art in implementing frame rate doublers, and more generally in providing frame rate multipliers, are overcome in accordance with the inventive arrangements. The solutions provided by the inventive arrangements are particularly appropriate for liquid crystal displays, for example LCOS. Moreover, the savings in memory requirements in accordance with certain embodiments enable more of the frame rate multiplier to be integrated.

A frame rate multiplier in accordance with the inventive arrangements can be implemented by writing the incoming video signal directly to the display, for example an LCOS display, as well as to a frame rate multiplier memory. In the case of a frame rate doubler, for example, this advantageously allows a one-half frame memory to be used instead of a full frame memory, and advantageously reduces the memory bandwidth required. The memory size reduction is very important, because a half-frame memory can be embedded on an integrated circuit providing other functions, whereas a full frame memory is too large, or at least, too expensive to embed. Moreover, it is advantageously not necessary to delay the audio to match the frame rate multiplied video, as in the ping-pong memory arrangement. Speedup memories, for example line memories, can be used to speed up the signals at the input to the display, allowing an LCOS display to be used, for example an LCOS display operating at $4f_H$.

The smaller memory bandwidth is a sufficient reduction to simultaneously write to and read from the half-frame memory with the same bandwidth as the incoming signal. The bandwidth in this embodiment of the invention is about 2/3 of the bandwidth needed for the ping-pong arrangement. In an alternative embodiment, the speedup memory following the half-frame delay can be omitted if the half-frame memory can be read intermittently, twice as fast as the half-frame memory is written. In other words, the half-frame memory is also used as a speedup memory. This embodiment requires one less speedup memory, but there is no reduction in the memory bandwidth, as the half-frame memory must be read at a faster rate (e.g., $4f_H$) than the rate of the incoming video signal (e.g., $2f_H$). The half-frame memory and both of the speed up memories can also be combined into a single memory.

It should be noted that the only special characteristic needed by the display is to have a direct row address select capability for writing any row selected, as opposed to only being writable strictly sequentially. In the frame rate doubler embodiment, successively written rows, or lines, are separated by half of the picture height. More specifically, for example, the line, or row, writing sequence for a 480p display can be 1, 241, 2, 242, and so on.

The frame rate multiplier can advantageously be implemented together with a number of different schemes for reversing the polarities of the fields driving the LCOS display as required. Moreover, the frame rate multiplier operates in such a way that the flicker due to the difference in brightness between the positive and negative fields is advantageously not perceptible.

BRIEF DESCRIPTION OF THE DRAWINGS

FIG. 2(*a*) is a Table useful for explaining the operation of the frame rate doubler shown in FIG. 1 in accordance with a first embodiment.

FIG. 2(*b*) is a Table useful for explaining the operation of the frame rate doubler shown in FIG. 1 in accordance with a second embodiment.

FIG. 3 is a Table useful for summarizing the operation of the frame rate doubler represented by the table in FIG. 2.

FIGS. 9(*a*)–9(*c*) are Tables useful for explaining the operation of the frame rate multipliers shown in FIGS. 7 and 8.

DETAILED DESCRIPTION OF THE PREFERRED EMBODIMENTS

Figure 1:
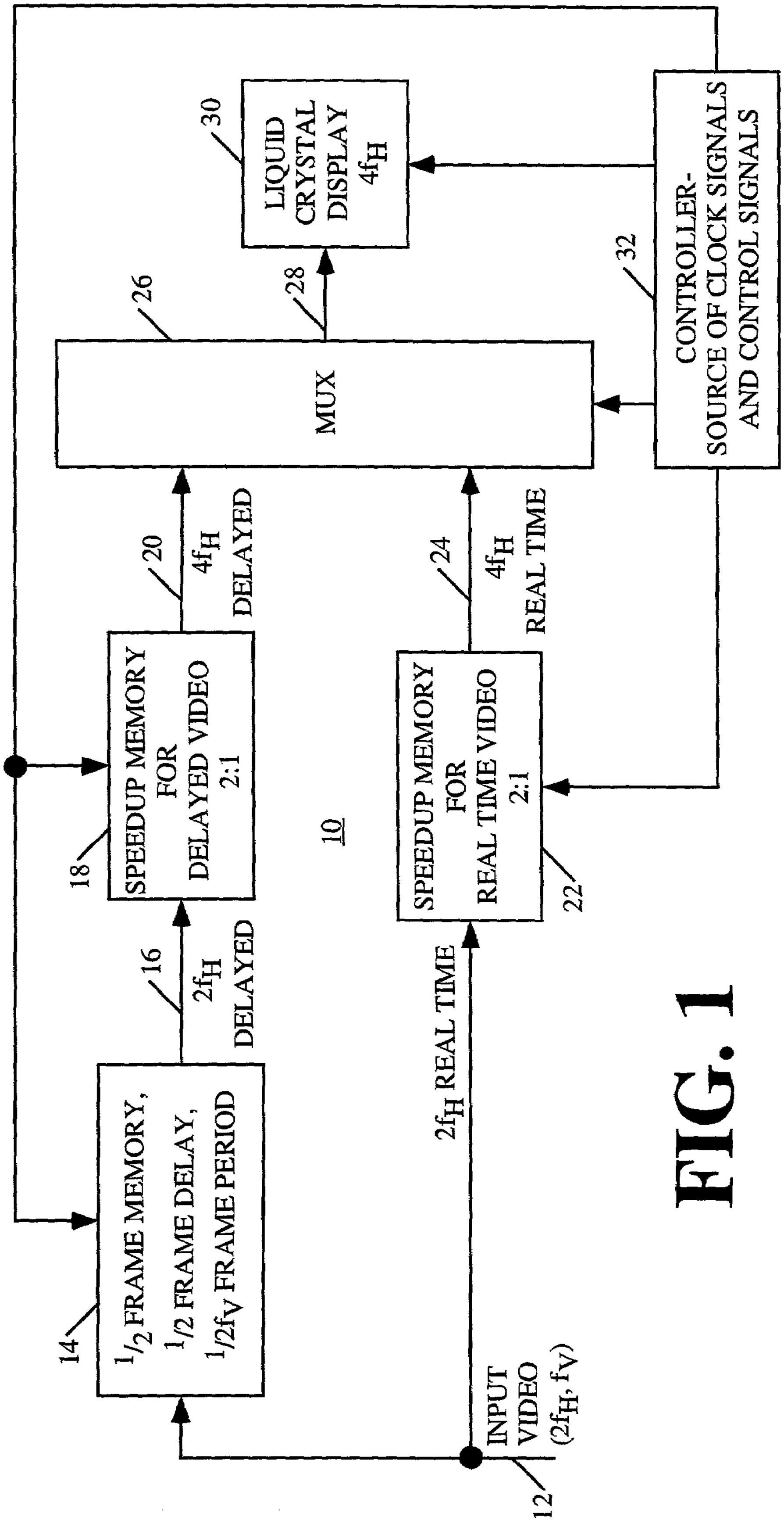
FIG. 1 is a block diagram of a frame rate multiplier in accordance with the inventive arrangements and adapted for operation as a frame rate doubler.
Figure 4A:
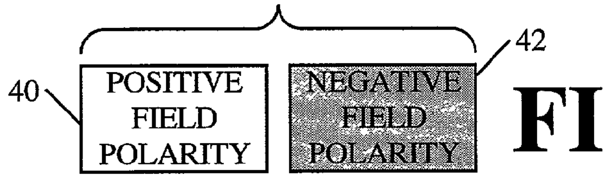
FIGS. 4(*a*)–4(*g*) are useful for explaining a first scheme for controlling field polarity.
Figure 4B:
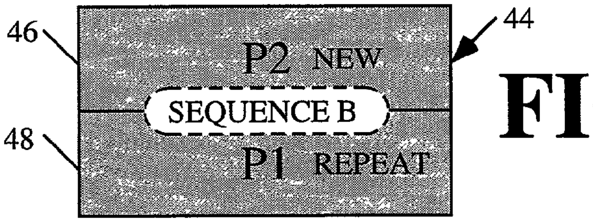
Figure 4C:
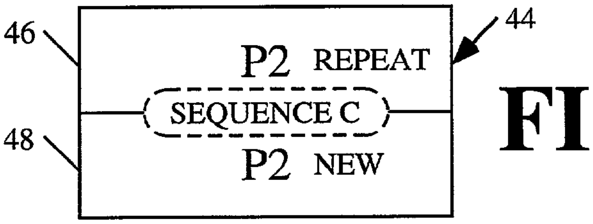
Figure 4D:
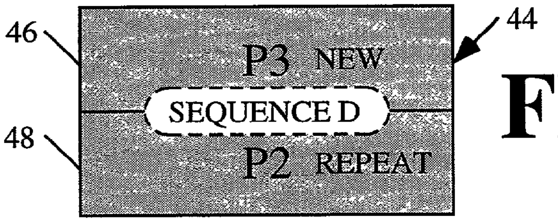
Figure 4E:
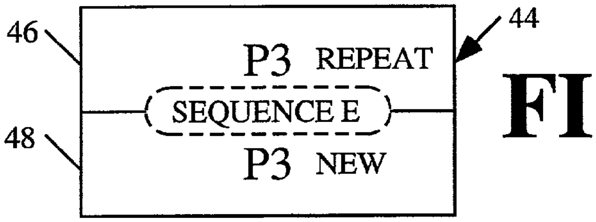
Figure 4F:
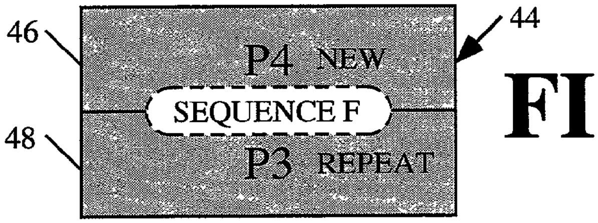
Figure 4G:
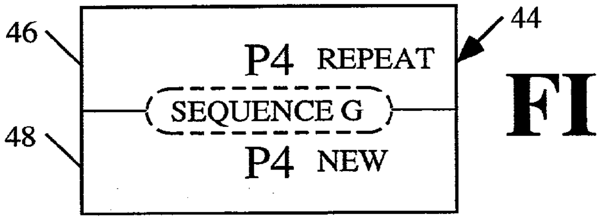
Figure 5A:
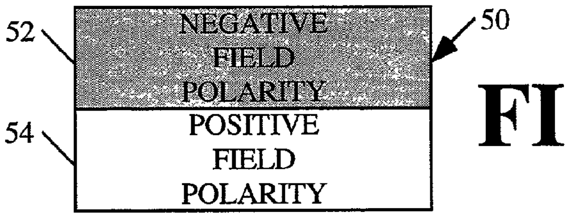
FIGS. 5(*a*)–5(*g*) are useful for explaining a second scheme for controlling field polarity.
Figure 5B:
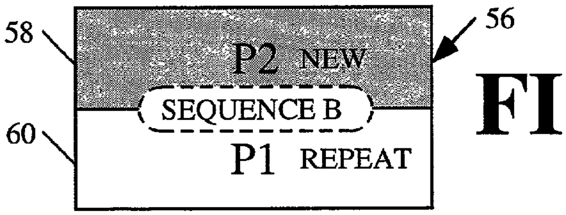
Figure 5C:
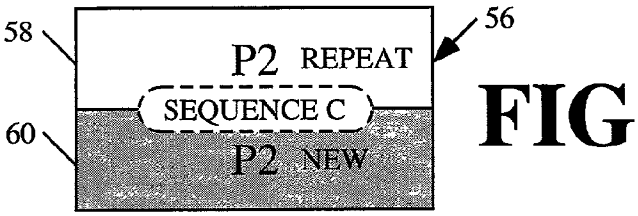
Figure 5D:
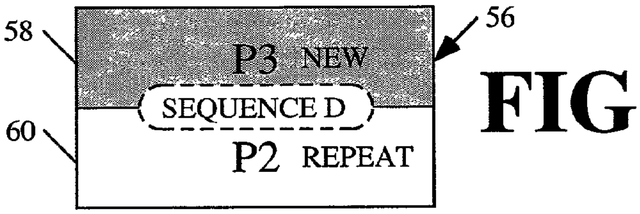
Figure 5E:
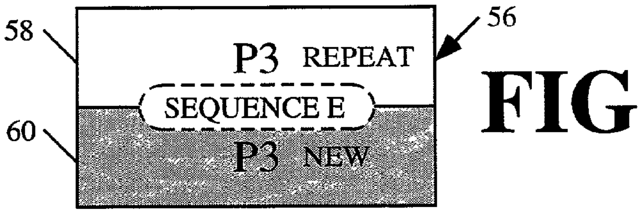
Figure 5F:
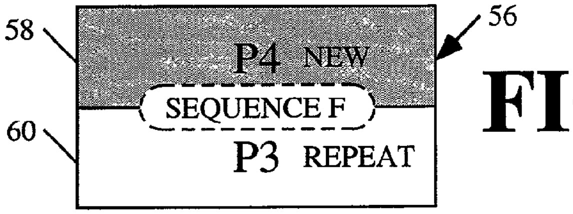
Figure 5G:
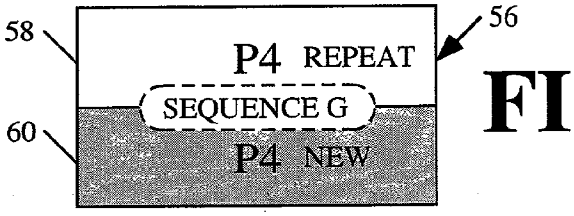

A frame rate multiplier 10 in accordance with the inventive arrangements is shown block diagram form in FIG. 1. The frame rate multiplier is embodied as a frame rate doubler in order to simplify the description. A frame rate multiplier for the general case of multiplying the frame rate by n, where $n \geqq 2$, is explained later in connection with FIGS. 8 and 9(*a*)–9(*c*). An input video signal 12 has a horizontal scanning frequency of $f_H in = 2f_H$ and a vertical scanning frequency $f_V in = f_V$. It will be assumed for purposes of illustration that input video signal 12 is in 480p format.

Input video signal 12 is an input to a partial frame memory 14. The partial frame memory is used to delay the video signal in time by ½ of a frame period. If $f_V = 60$ Hz, the temporal frame delay is $1/f_V = 1/120$ second.

The output signal 16 from the partial frame memory is at $2f_H$ and is delayed in time. The delayed video signal is speeded up by a 2:1 speedup memory 18. The output signal 20 of speedup memory 18 is both delayed and speeded up. The delayed and speeded up video signal 20 is an input to a multiplexer (MUX) 26.

The input video signal 12 is also an input to a 2:1 speedup memory 22. The speeded up output signal 24 is a second input to multiplexer 26. The memories 18 and 22 can be distinguished for reference as a memory for delayed video and a memory for real time video respectively. The output signals 20 and 24 can be distinguished for reference as $4f_H$ delayed and $4f_H$ real time respectively.

The multiplexer 26 has an output 28 coupled to a liquid crystal display (LCD) 30 that operates at $4f_H$. The LCD in the presently preferred embodiment is a liquid crystal on silicon (LCOS) as described earlier. The LCD 30 is capable of random row access control, that is, successive lines of video need not be written into successive rows of the LCD matrix sequentially. Moreover, in such liquid crystal displays, each cell, or pixel, remains lighted with the same intensity until the input signal is changed, thus acting as a sample and hold. The pixel does not decay.

A controller 32 is a source of clock signals and control signals for the operation of the partial frame memory 14, the speedup memories 18 and 22, the multiplexer 26 and the liquid crystal display. The operation of controller 32 is constrained to provide, for example, the operating characteristics and results illustrated by the Tables in FIGS. 2(*a*), 2(*b*), 3, 4(*a*)–4*g*) and 5(*a*)–5(*g*).

Each real time line and each delayed line supplied to the liquid crystal display must be available as an input to the multiplexer, which is the same as being available as a speeded up video line, within ½ of the frame period of the input video signal, to use a frame rate doubler as an example. However, it is not a problem if the video lines are available before ½ of the frame period has passed. Accordingly, it is not strictly necessary that the speedup factor of the real time video and the delayed video be limited to 2:1. The speedup factor can be faster if that proves convenient in the circuit design for other reasons. Moreover, it is not strictly necessary that the speedup factors for the real time video and the delayed video be the same as one another, as long as each is fast enough.

The Tables in FIGS. 2(*a*) and 2(*b*) illustrate two different modes of operation of the circuit 10. FIG. 3 is a summary of operation at a higher level that is appropriate for both FIGS. 2(*a*) and 2(*b*). As in FIG. 1, it is assumed that memory 14 is a ½ frame memory, and the frame delay is ½ of a frame period. The video speedup provided by each of memories 18 and 22 is 2:1. The input is a 480p $2f_H$ signal. The speeded up video is at $4f_H$ and the LCD 30 operates at $4f_H$. The 480p signal has $f_V$=60 Hz. The ½ frame delay in memory 14 is 1/120 second.

With reference to FIG. 2(*a*), the first column represents a picture number and line number of a 480p input video signal. The row 1 entry "P1/L1" denotes picture 1, line 1. The row 4 entry denotes picture 1, line 240. The second column represents the picture and line number of the $2f_H$ Delayed input signal 20 to the multiplexer 26. The third column represents the picture and line number of the $2f_H$ Real Time input signal 24 to the multiplexer 26. The fourth column represents the output of the multiplexer 26. The fifth column represents the result of writing the selected output of the multiplexer 26 into the LCD 30. The sixth column is a Sequence designation useful for reference in FIG. 2(*a*) and keyed to FIG. 3, FIGS. 4(*b*)–4(*g*) and FIGS. 5(*b*)–5(*g*). Using the Sequence designation as a reference, in the first row of Sequence B the first line of the second picture overwrites, that is replaces, the first line of the first picture.

With reference to Sequence A and FIG. 1, assume that line 1 of picture 1 in the input video signal propagates through speedup memory 22. At the same time, line 1 of picture 1 will propagate though the delay frame memory 14. As successive lines are received, line 241 will eventually be available to be read as the input signal 24 to the multiplexer. By that time, line 1 will have propagated through delay memory 14 and speedup memory 18, and be available to be read as the input signal 20 to the multiplexer. Then, line 1 can be selected for an output of the multiplexer for writing into line 1 of the LCD 30. Next, line 241 can be selected for an output of the multiplexer for writing into line 241 of the LCD 30. By the time lines 1 and 241 have been written, lines 2 and 242 will be available to be read as the inputs to the multiplexer. Line 2 is written, followed by line 242; line 3 is written, followed by line 243, and so on. The picture is written in top and bottom halves simultaneously. The spatial separation of the lines being written to the display is ½ of the picture height. In other words, the separation of successively written lines of each pair of inputs available to the multiplexer is one-half of the picture height. It is of course possible for the LCD display to have more rows and/or columns of pixels than are needed to display the video signal.

The sequence described above is more fully illustrated in FIG. 2(*a*). Rows with large dots (•••••) denote rows skipped to conserve space. Rows with dashes (- - -) denote that a place is being held in the time sequence to permit both input signals to the multiplexer to be sequentially selected and written.

Sequence A described how the first picture was written into the display 30. Sequences B–F illustrate how the frame doubling is actually accomplished. At the beginning of Sequence B, as shown in the first row of Sequence B, the second picture is beginning as an input to the frame rate multiplier. Picture 2, line 1 is the Real Time input to the multiplexer and picture 1, line 241 has propagated through memory 14 and is now the Delayed input to the multiplexer. As sequence B proceeds, the top half of picture 1 is replaced by the top half of picture 2 and the bottom half of picture 1 is replaced by the bottom half of picture 1.

At the beginning of Sequence C, as shown in the first row of Sequence C, the bottom half of the second picture is beginning as an input to the frame rate multiplier. Picture 2, line 241 is the Real Time input to the multiplexer and picture 2, line 1 has propagated through memory 14 and is now the Delayed input to the multiplexer. As sequence C proceeds, the top half of picture 2 is replaced by the top half of picture 2 and the bottom half of picture 1 is replaced by the bottom half of picture 2.

At the beginning of Sequence D, as shown in the first row of Sequence D, the top half of the third picture is beginning as an input to the frame rate multiplier. Picture 3, line 1 is the Real Time input to the multiplexer and picture 2, line 241 has propagated through memory 14 and is now the Delayed input to the multiplexer. As sequence D proceeds, the top half of picture 2 is replaced by the top half of picture 3 and the bottom half of picture 2 is replaced by the bottom half of picture 2.

Sequences E and F follow the pattern of Sequences B, C and D. The pattern of writing top and bottom halves of successive pictures is summarized in FIG. 3. The column entitled New or Repeat indicates whether a given top or bottom half has been written for the first time or the second time. The right hand column are Greek letters followed by numbers that link the writing of top and bottom halves of pictures in successive sequences. It should be noted again that each sequence requires ½ of the frame period to complete. Accordingly, every successive pair of sequences (e.g., BC, CD, DE, etc.) requires one full frame period to complete.

As a first example, α1 denotes the first time that the bottom half of picture 1 is written to the display. β1 denotes the first time that the top half of picture 2 is written to the display. α2 denotes the second time that the bottom half of picture 2 is written to the display. β2 denotes the second time that the top half of picture 2 is written to the display.

As a second example, consider the sequence beginning with η1. η1 denotes the first time that the bottom half of picture 4 is written to the display. θ1 denotes the first time that the top half of picture 5 is written to the display. η2 denotes the second time that the bottom half of picture 4 is written to the display. θ2 denotes the second time that the top half of picture 5 is written to the display.

In each example, two top picture halves and two bottom picture halves have been written into the liquid crystal display in one frame period. The frame rate has thus been multiplied by 2.

It must be remembered that the average DC level of the positive and negative polarity fields is desirably 0. At the line or row level of the display, each row is desirably driven at a 50% duty cycle with regard to field polarity. It appears that the Delayed and Real Time inputs to the multiplexer are always alternately selected as outputs. This is generally true of the inventive arrangements, and strictly true in the embodiment shown in FIG. 2(*b*), but not strictly the case in the embodiment of FIG. 2(*a*). In fact, this is the only difference between the embodiments represented by FIGS. 2(*a*) and 2(*b*), and a row by row description of FIG. 2(*b*) as with FIG. 2(*a*) is unnecessary. Indeed, the summary of FIG. 3 applies to both embodiments.

It can be seen in FIG. 2(*a*) that the first row output from the multiplexer in each of the sequences is the first line of a given picture, that is, P1/L1, P2/L1, P2/L1, P3/L1, P3/L1, etc. At the beginning of Sequence B, the first output of the multiplexer is the Real Time input P2/L1. At the beginning of Sequence C, the first output of the multiplexer is the Delayed input P2/L1. But, the last output of Sequence B, namely P1/L480, was also the Delayed output. Accordingly, the alternating selection of inputs for the multiplexer is periodically interrupted in order to maintain the desirable 50% duty cycle.

It can be seen in FIG. 2(*b*) that the first row output from the multiplexer in each of the sequences is not the first line of a given picture, that is, P1/L241, P2/L1, P2/L241, P3/L1, P3/L241, etc. If the multiplexer selection always alternates, as in FIG. 2(*b*), the following sequence of writing lines will occur for two successive pictures: 1, 241, 2, 242, 3, 243, . . . 238, 478, 239, 479, 240, 480, 241, 1 242, 2, 243, 3, . . . 478, 238, 479, 239, 480, 240, 1, 241, etc. In the first part of the sequence with the single underline, there are 480 lines written before line 1 is written again. In the second part of the sequence with the double underline there are 479 lines written before line 1 is written again. This represents a small deviation from a 50% duty cycle.

The embodiment of FIG. 2(*a*) achieves the 50% duty cycle but requires a more complex operation of the multiplexer. The embodiment of FIG. 2(*b*) departs somewhat from the 50% duty cycle, but if the liquid crystal display can tolerate the deviation, the operation of the frame rate multiplier is less complex.

Electrical field polarity can be managed in accordance with the inventive arrangements. A first scheme for managing field polarity is shown in FIGS. 4(*a*)–(*g*). A second scheme for managing field polarity is shown in FIGS. 5(*a*)–(*g*). Each of these representative schemes can be used with the embodiment of FIG. 1, operated in accordance with FIG. 2(*a*) or 2(*b*), as well as the further embodiments shown in FIGS. 6, 7 and 8.

FIG. 4(*a*) is a key for understanding FIGS. 4(*b*)–(*g*). A white background 40 represents a liquid crystal display with a positive field polarity and a gray background 42 represents a liquid crystal display with a negative field polarity. A liquid crystal display 44 in FIG. 4(*b*) has a top half 46 and a bottom half 48. During Sequence B, for example, the display 44 is driven by a negative polarity field in each of the top and bottom halves. The driving field polarity reverses to positive at the beginning of Sequence C as shown in FIG. 4(*c*). The driving field polarity reverses to negative at the beginning of Sequence D as shown in FIG. 4(*d*). The driving field polarity reverses to positive at the beginning of Sequence E as shown in FIG. 4(*e*). The field polarity continues to alternate as shown in FIGS. 4(*f*) and 4(*g*). This embodiment can be implemented, for example, by changing the driving field polarity every time the multiplexer supplies the number of lines constituting a full picture height, in this example, every 480 lines. In other words, before writing the first line of each sequence.

FIG. 5(*a*) is a key for understanding FIGS. 5(*b*)–(*g*). A liquid crystal display 50 has a top half 52 and a bottom half 54. One of the top and bottom halves is always written with a positive electric field while the other one of the top and bottom halves is always written with a negative electric field. Further, each of the top and bottom halves is successively and completely written with alternating polarity electric fields. A white background represents a liquid crystal display with a positive field polarity and a gray background represents a liquid crystal display with a negative field polarity. A liquid crystal display 56 in FIG. 5(*b*) has a top half 58 and a bottom half 60. During Sequence B, for example, the display 56 is driven by a negative polarity field in the top half 58 and a positive polarity field in the bottom half 60. The driving field polarity for each of the top and bottom halves reverses at the beginning of Sequence C as shown in FIG. 5(*c*). The driving field polarity for each of the top and bottom halves reverses again at the beginning of Sequence D as shown in FIG. 5(*d*). The driving field polarity for each of the top and bottom halves continues to reverse as shown in FIGS. 5(*e*), 5(*f*) and 5(*g*). This scheme requires that the driving field polarity for each line reverses with each output line of the multiplexer.

Figure 6:
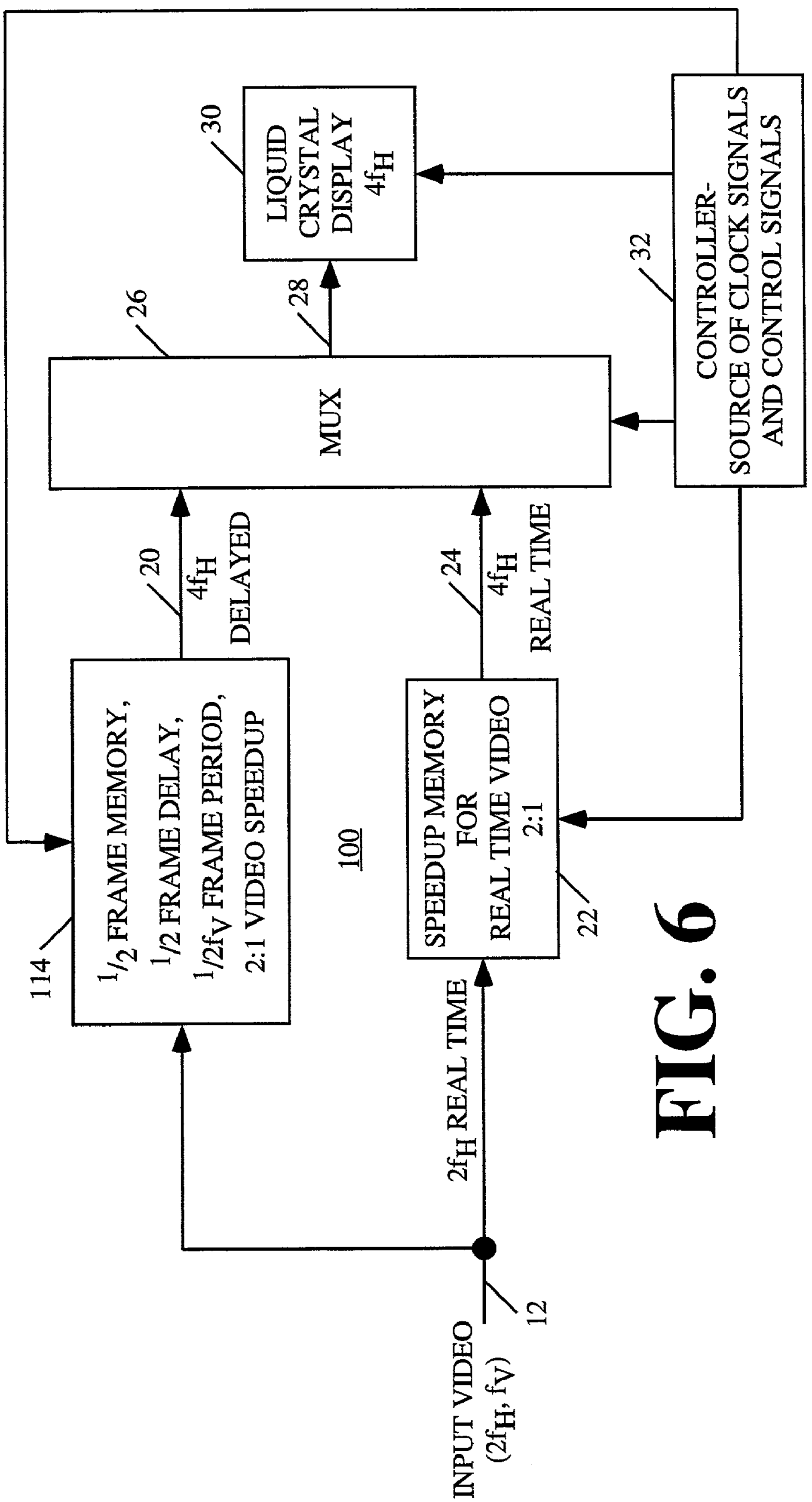
FIG. 6 is a block diagram of an alternative embodiment of a frame rate multiplier in accordance with the inventive arrangements and adapted for operation as a frame rate doubler.

FIG. 6 illustrates an alternative embodiment. Frame rate multiplier 100, embodied as a frame rate doubler, is identical to the frame rate multiplier 10 in FIG. 1 except that the partial frame 14 and the speedup memory 18 are replaced by a single frame memory 114. Memory 114 provides both the partial frame delay and the video speedup. This embodiment requires one less speedup memory, but there is no reduction in the memory bandwidth, as the half-frame memory must be read a faster rate (e.g., $4f_H$) than the rate of the incoming video signal (e.g., $2f_H$). In all other respects, the operation of this embodiment is the same as that shown in FIG. 1. The embodiment of FIG. 6 can be operated, for example, as explained in FIGS. 2(*a*), 2(*b*), 3, 4(*a*)–(*g*) and 5(*a*)–(*g*).

Figure 7:
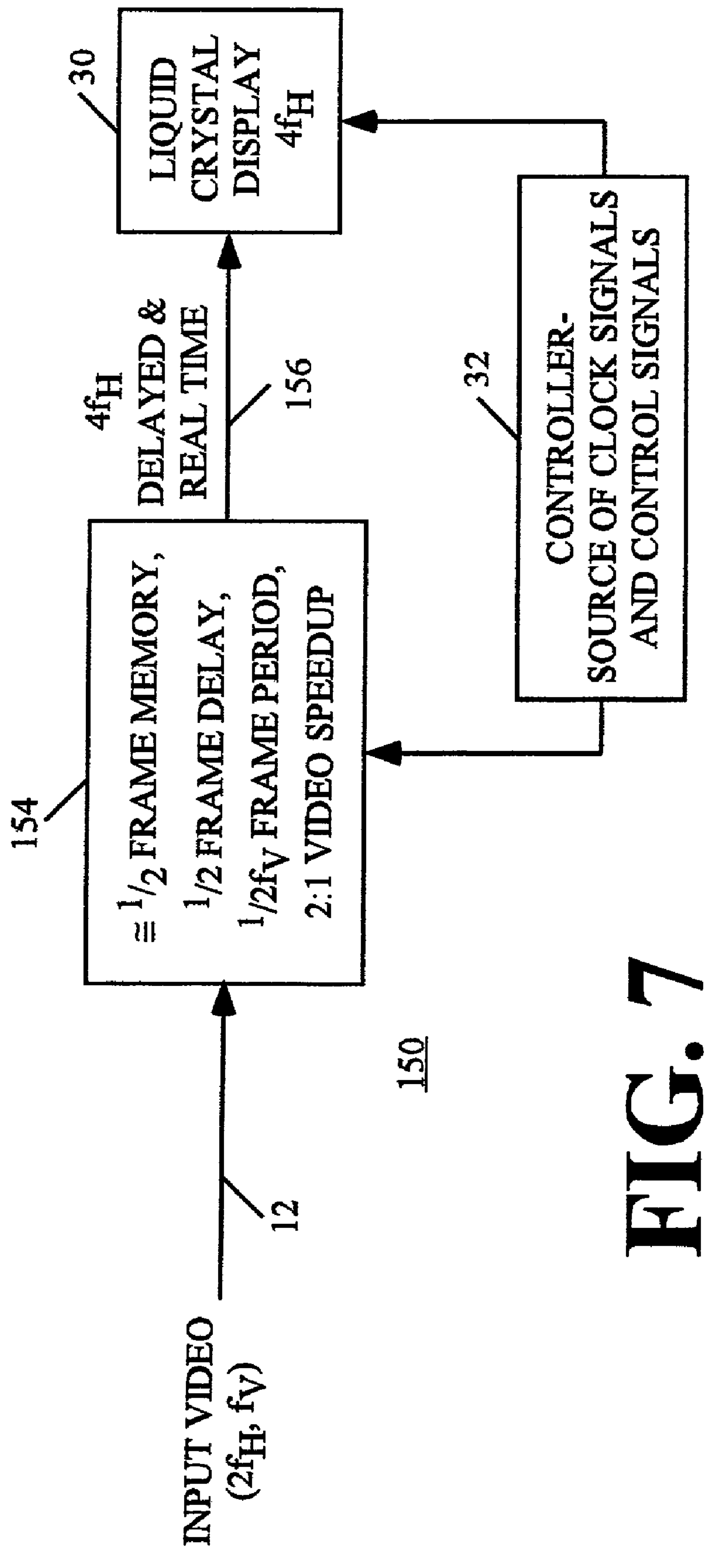
FIG. 7 is a block diagram of another alternative embodiment of a frame rate multiplier in accordance with the inventive arrangements and adapted for operation as a frame rate doubler.

FIG. 7 illustrates another alternative embodiment. Frame rate multiplier 150, embodied as a frame rate doubler, is identical to the frame rate multiplier 10 in FIG. 1 except that the partial frame memory 14, the speedup memory 18 and the speedup memory 22 are replaced by a single memory 154. Memory 154 provides both the partial frame delay and the video speedup for both the delayed and real time versions of the input video signal 12. It is necessary that the read port be selectively addressable in order that real time video lines and the delayed video lines can be read alternately, speeded up and then supplied to the liquid crystal display in accordance with the methods taught herein. All of the data manipulations result from controlling the read port of the memory 154, which is reflected in the corresponding operation of the controller 32. This embodiment requires only one memory that functions as both of the speedup memories and the delay memory. As in the embodiment of FIG. 6, there is no reduction in the memory bandwidth, as the half-frame memory must be read a faster rate (e.g., $4f_H$) than the rate of the incoming video signal (e.g., $2f_H$). Moreover, it is expected that the half-frame memory must be somewhat larger than one-half of a frame, for example in the range of one-half of a line to several lines, particularly to operate in accordance with the embodiment represented by FIG. 2(*a*). Accordingly, the size of half-frame memory 154 is approximately (≅) one-half of a frame. With regard to the advantage of embodying the memory in an integrated circuit, the extra lines needed are of no practical consequence. In this respect, the memory 154 is still fairly referred to in general as a half-frame memory. In all other respects, the operation of this embodiment is the same as that shown in FIG. 1. The embodiment of FIG. 6 can be operated, for example, as explained in FIGS. 2(*a*), 2(*b*), 3, 4(*a*)–(*g*) and 5(*a*)–(*g*).

Figure 8:
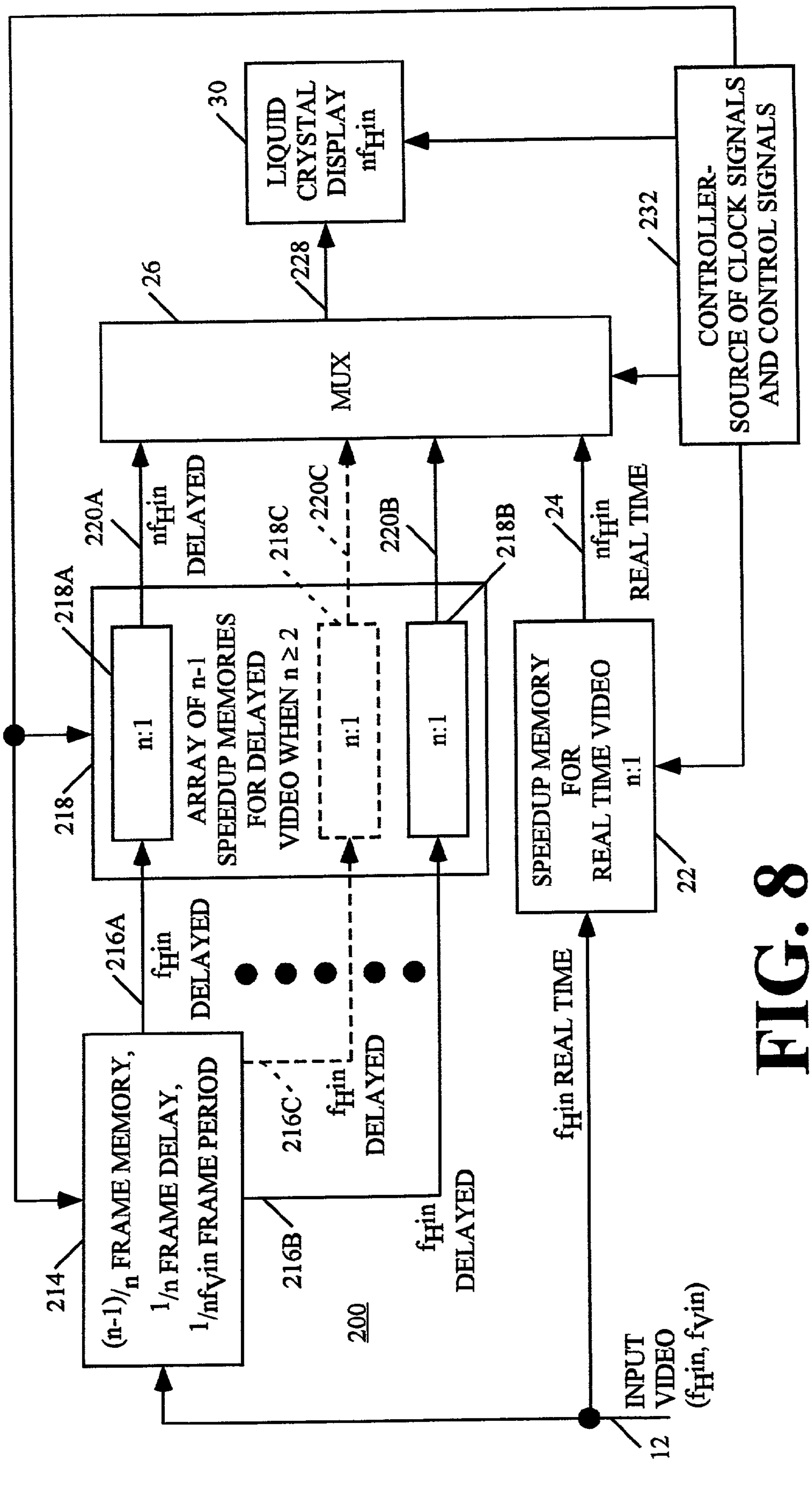
FIG. 8 is a block diagram of yet another alternative embodiment of a frame rate multiplier in accordance with the inventive arrangements.

Frame rate multiplier 200 shown in FIG. 8 illustrates how the frame rate multiplier is adapted for operation when n>2. A partial frame memory 214 has multiple output taps 216A, 216B, 216C, etc., providing equal delays. An array 218 of n−1 speedup memories includes speedup memories 218A, 218B, 218C, etc. An n:1 speedup memory is provided for each delayed output of memory 214. Each speedup memory provides an output 220A, 220B, 220C, etc., which is a selectable input for the multiplexer 226. The operation of the Real Time speedup memory 22, with output 24 is the same. There are n−1 speedup memories in the array 218, and there are n speedup memories in the circuit 200. Whether or not the Real Time speedup memory is or is not considered a part of the array 218 is a matter of convenience.

The operation of the liquid crystal display is altered insofar as the picture will be written into the display as n parts. If n=3, for example, the picture will be divided into and processed as top, middle and bottom thirds. Each third would have 160 lines. The output taps of the frame memory would be timed for ⅓ of frame period and ⅔ of a frame period. The writing sequence by line for n=3 for a 480p video signal can be, for example, 1, 161, 321, 2, 162, 322, 3, 163, 323, etc. If n=4, for example, the picture will be divided into and processed as top, upper middle, lower middle and bottom fourths. Each fourth would have 120 lines. The output taps of the frame memory would be timed for ¼ of frame period, ½ of frame period and ¾ of a frame period. The writing sequence by line for n=4 for a 480p video signal can be, for example, 1, 121, 241, 361, 2, 122, 242, 362, 3, 123, 243, 363, etc. The further detailed operation of this embodiment is very tedious to illustrate and explain as was done in FIGS. 2(*a*), 2(*b*) and 3. However, those skilled in the art will encounter no difficulties in scaling up the size and capacity of the frame rate multiplier 200 based upon the teachings of the preceding embodiments. It can be noted, for example, that when n=3 the size of the delay memory must be ⅔ of a frame memory. When n=4 the size of the delay memory must be ¾ of a frame memory. Therefore, the tradeoff for higher frame multiplication rates is the need for a larger frame memory, as well as a more complex set of clock and control signals generated by controller 232. In view of the foregoing teachings, it can be understood by one skilled in the art that under some circumstances, for example when 1<n<2, not all of the lines of each picture will be written more than once. It should be noted that all of the operations implemented by frame rate multiplier 200 can be implemented by a frame rate multiplier with a single memory as shown in FIG. 7. Accordingly, the Tables in FIGS. 9(*a*)–(*c*) are appropriate for both FIGS. 7 and 8.

FIG. 9(*a*) is a Table illustrating the frame period of the speeded up video signals for n =2, 3 or 4 when $f_V$in is 50 Hz or 60 Hz. FIG. 9(*b*) is a Table illustrating the horizontal scanning frequency $nf_H$in of the speeded up video signals for n=2, 3 or 4 when $f_H$in is $f_H$, $2f_H$ and $3f_H$.

FIG. 9(*c*) is a Table summarizing the operating parameters and structure of frame rate multiplier for n=2, 3 and 4. When n=2, the size of the memory 214 is ½ of a frame, there are 2 speedup memories and the outputs must be delayed by ½ of a frame relative to one another, as in FIG. 1. When n=3, the size of the memory 214 is ⅔ of a frame, there are 2 speedup memories in the array 218, 3 speedup memories altogether, and the outputs must be delayed by ⅓ of a frame period relative to one another. When n=4, the size of the memory 214 is ¾ of a frame, there are 3 speedup memories in the array 218, 4 speedup memories altogether and the outputs must be delayed by ¼ of a frame period relative to one another.

It can now be appreciated by those skilled in the art that the methods taught herein are generally applicable to all frame rate multipliers where the multiplication factor n>1. A multiplication factor of n=1.5, for example, can represent a situation where a 50 Hz frame rate input signal can advantageously be frame rate multiplied to 75 Hz to avoid flicker. However, it can also now be appreciated that hardware implementations of the methods taught herein are advantageously easier when n≧2, and more particularly, when n is also an integer.

What is claimed is:

1. A method for multiplying the frame rate of an input video signal comprising the steps of:

delaying successive respective lines of said input video signal to provide a first video signal delayed with respect to said input video signal and speeding up said successive respective lines of said input video signal to provide a second video signal speeded up with respect to said input video signal;

speeding up said first video signal to provide a third video signal; and displaying said input video signal by alternately supplying at least one line of said second video signal and at least one line of said third video signal to display.

2. The method of claim 1, wherein the step of delaying said input video signal includes a step of storing said input video signal in a delay memory.

3. The method of claim 1, comprising the steps of:

periodically interrupting said supplying step to supply a number of consecutive lines of said second video signal;

periodically interrupting said supplying step to supply a number of consecutive lines of said speeded up first video signal; and, alternating said interrupting steps to maintain a uniform time interval between writing lines into a same line-number position on said display.

4. The method of claim 1, wherein said step of alternately supplying said video signal comprises a the step of alternately writing lines of said video signal to a said display.

5. The method of claim 2, wherein the step of storing said lines of video in said delay memory is carried out by storing less than a full frame of video in said delay memory.

6. The method of claim 1, comprising the steps of:

at least doubling said frame rate of said input video signal; and, writing selected lines of said video signal multiple times to said display.

7. The method of claim 1, comprising the step of speeding up said first video signal and said input video signal to the same line rate.

8. The method of claim 1 including a step of storing in said delay memory not more than a portion of said input signal approximately equal to 1/n of a frame of said input video signal, wherein a represents a multiplying factor for said frame rate multiplier.

9. The frame rate multiplier of claim 1 wherein a frame of said input video signal is displayed by alternately supplying lines of video comprising said frame to a top portion of a liquid crystal display and a bottom portion of said liquid crystal display to display said frame.

10. The frame rate multiplier of claim 9 wherein said frame is displayed by supplying said lines of video first to top and bottom portions of said display before supplying said lines of video to a middle portion of said display.

11. A method for multiplying the frame rate of a video signal comprising the steps of:

delaying lines of said input video signal for a time less than one a frame period to provide a first video signal delayed with respect to said input video signal;

speeding up said first video signal to provide a second video signal;

speeding up said lines of said input video signal to provide a third video signal;

alternately supplying lines of said second video signal and lines of said third video signal to a display.

12. The method of claim 11, comprising the steps of:

periodically interrupting said supplying step to supply a number of consecutive lines of said third video signal;

periodically interrupting said supplying step to supply a number of consecutive lines of said second video signal; and, alternating said interrupting steps to maintain a uniform time interval between writing lines into the same line-number position on said display.

13. The method of claim 11, comprising the step of alternately supplying said lines to top and bottom halves of said display.

14. The method of claim 11, comprising the step of propagating said input video signal through a memory embedded in an integrated circuit.

15. The method of claim 11, comprising the step of speeding up lines of said first video signal and lines of said input video signal to the same line rate.

16. A frame rate multiplier for an input video signal comprising:

a delay memory for delaying lines of said input video signal to provide a first video signal delayed with respect to said input video signal;

a first speed up memory for receiving said lines of said input video signal and for providing a second video signal speeded up with respect to said input video signal;

a second speed up memory coupled to an output of said delay memory for speeding up said first video signal; and a multiplexer coupled to said first and second speed up memories for alternately supplying said first and second video signals to a display.

17. The frame rate multiplier of claim 16, wherein said delay memory comprises a partial frame memory storing a less than one frame of said video signal.

18. The frame rate multiplier of claim 16, wherein said speed up memory comprises an array of speed up memories.

19. The frame rate multiplier of claim 16 wherein said delay memory comprises an array of memories.

20. The frame rate multiplier of claim 16, wherein said delay memory and said first speed up memory comprise a single memory.

21. The frame rate multiplier of claim 16, wherein said delay memory and said first and second speed up memories comprise a single memory.

22. The frame rate multiplier of claim 16 further comprising a controller coupled to said multiplexer such that said multiplexer is controlled to alternately select a number of successive lines from said first and second speed up memories so as to maintain a uniform time interval between writing lines into the same line-number position on said liquid crystal display.

23. A frame rate doubler comprising:

a first memory for delaying lines of said input video signal to provide a first video signal delayed with respect to said input video signal;

a second memory for speeding up lines of said first video signal;

a third memory for speeding up said lines of said input video signal;

a multiplexer coupled to said second and third memories for alternately selecting video signals output from said second and third memories for writing to said display.

24. The frame rate doubler of claim 23, wherein said first memory stores not more than about ½ of a frame said video signal.

25. The frame rate doubler of claim 23, further comprising a controller coupled to said second and third memories and programmed to:

periodically interrupt said supply of said video portions to said display;

supply to said display during said periodic interruptions n successive lines from at least one of said second and third memories so as to maintain a uniform time interval between writing lines into a same line-number position on said display.

26. The frame rate doubler of claim 23, wherein said display is selected from the group comprising: liquid crystal on silicon and liquid crystal.

27. The frame rate doubler of claim 23, wherein said first and second memories are functionally combined into a singe memory.

* * * * *